United States Patent
Kawato

(10) Patent No.: US 6,762,561 B1
(45) Date of Patent: Jul. 13, 2004

(54) RADIO FREQUENCY RESONATOR

(75) Inventor: Eizo Kawato, Kizucho (JP)

(73) Assignee: Shimadzu Research Laboratory (Europe) Ltd., Manchester (GB)

( * ) Notice: Subject to any disclaimer, the term of this patent is extended or adjusted under 35 U.S.C. 154(b) by 0 days.

(21) Appl. No.: 10/221,893

(22) PCT Filed: Mar. 31, 2000

(86) PCT No.: PCT/GB00/01239

§ 371 (c)(1),
(2), (4) Date: Sep. 17, 2002

(87) PCT Pub. No.: WO01/75935

PCT Pub. Date: Oct. 11, 2001

(51) Int. Cl.[7] .......................... H03B 11/00; H03B 11/08; H03B 11/10
(52) U.S. Cl. ..................... 315/39.51; 331/167; 331/165; 331/166; 331/173; 331/128; 315/226; 315/276; 250/292
(58) Field of Search ................................ 331/165, 166, 331/167, 173, 128; 250/281, 282, 287, 288, 292; 315/39.51, 209 PZ, 226, 276; 324/318, 322; 333/99 MP; 363/87; 388/819

(56) References Cited

U.S. PATENT DOCUMENTS

| | | | | |
|---|---|---|---|---|
| 2,939,952 A | * | 6/1960 | Paul et al. .................. 250/292 |
| 3,866,145 A | * | 2/1975 | Hess et al. .................. 331/128 |
| 4,547,706 A | * | 10/1985 | Krummel ..................... 315/226 |
| 4,550,297 A | * | 10/1985 | Harrison ................ 333/99 MP |
| 4,767,999 A | * | 8/1988 | VerPlanck ................... 331/166 |
| 4,801,855 A | * | 1/1989 | Nohmi et al. ................ 388/819 |
| 4,801,885 A | * | 1/1989 | Meissner et al. ............ 324/318 |
| 4,815,052 A | * | 3/1989 | Walker ......................... 363/87 |
| 5,243,289 A | * | 9/1993 | Blum et al. .................. 324/322 |
| 5,466,992 A | * | 11/1995 | Nemirow et al. ........... 315/276 |
| 5,663,648 A | * | 9/1997 | Chapman et al. ........... 324/322 |
| 6,124,678 A | * | 9/2000 | Bishop et al. ........ 315/209 PZ |
| 6,483,244 B1 | * | 11/2002 | Kawato et al. .......... 315/39.51 |

FOREIGN PATENT DOCUMENTS

| | | | |
|---|---|---|---|
| EP | 0 926 926 A1 | 6/1999 | |
| FR | 2 326 804 | 4/1977 | |
| FR | 2326804 A | * 6/1977 | ............ A61N/1/32 |
| WO | WO 99/39370 A1 | 8/1999 | |
| WO | WO 00/38312 A1 | 6/2000 | |

OTHER PUBLICATIONS

Blauth, "Dynamic mass spectometers," XP–00215375, p. 110–155 (1966).
Walcher, XP002153716, p. 304–309 (1989).

* cited by examiner

*Primary Examiner*—John R. Lee
*Assistant Examiner*—Mary El-Shammaa
(74) *Attorney, Agent, or Firm*—Leydig, Voit & Mayer, Ltd.

(57) ABSTRACT

An apparatus having a radio frequency resonator, which has a coil, a capacitor means and at least one switch means being associated with another capacitor means, a resistor means and a high voltage supply means, one end of the switch means being connected to a junction of the coil and the capacitor means where a radio frequency voltage is provided, another end of the switch means being connected to ground with said another capacitor means and to the high voltage power supply means with the resistor means.

17 Claims, 4 Drawing Sheets

RADIO FREQUENCY RESONATOR

FIELD OF INVENTION

The present invention relates to a radio frequency (RF) resonator and an apparatus using a RF resonator circuit. More specifically, the invention relates to an ion-trapping device namely a quadrupole ion trap.

BACKGROUND OF THE INVENTION

The quadrupole ion trap was initially described by Paul et al. in U.S. Pat. No. 2,939,952 and normally consists of three electrodes; a ring electrode and two end-cap electrodes, one on each side of the ring electrode. A radio frequency (RF) voltage is normally applied to the ring electrode, and the two end-cap electrodes are normally grounded. A coil is connected to the ring electrode forming a LC resonator together with the capacitance between the ring electrode and the two end-cap electrodes as well as the capacitance of all other circuit elements connected to the ring electrode. Because of the high Q-value of the resonator, even a low voltage RF driver, which is connected to the coil directly or through transformer coupling, can effectively produce a high RF voltage on the ring electrode.

A quadrupole ion trap can be used as an ion-trapping device of a mass analysis apparatus together with a variety of ion sources. One of the most popular ion sources is liquid chromatography with electrospray ionization. Another ion source, which seems a very promising combination with the ion trap, is matrix-assisted laser desorption/ionization (MALDI).

The ions produced by a MALDI ion source are inevitably pulsed and synchronized to the laser pulse. The efficiency of trapping these ions can be maximized by using a method of fast start of RF voltage as described in PCT Application No. PCT/GB99/00083. Unfortunately, an ordinary RF driver circuit provides only a low excitation voltage, and the rate of increase of RF voltage will then be quite low. The time to establish a required RF voltage usually requires several cycles of RF or more than that.

One method of fast start and/or fast termination of a RF resonator is described in PCT application PCT/GB98/03856. In this method a RF resonator consists of a coil, a capacitor means and two switch means, each having an internal resistance. One end of each switch means is connected to a junction of the coil and the capacitor means where a RF voltage is provided. Another end of each switch means is connected to high voltage power supplies having opposite polarities. The method comprises closing one of the switch means for a short period of time for fast start of the RF resonator, and/or closing both of the switch means for a time interval for fast termination of the RF resonator. Although this method is capable of achieving fast start and/or fast termination of a RF resonator, it may be difficult, in some situations, to sustain high RF voltages. The switch means usually consists of semiconductor switching devices such as MOSFET, IGBT, bipolar transistor, thyristor, etc. These semiconductor devices, while they are not in the conducting state, have capacitance strongly dependent on the applied voltage. In these circumstances, there may arise a shift in resonant frequency with increasing RF voltage, due to a change in the capacitance of the switching device.

A change of capacitance is more significant when the voltage applied on the switching device approaches zero. At fast start of the resonator, one of the switch means is closed and a voltage of the ring electrode approaches the voltage of the high voltage power supply to which the switch means is connected. At that moment a voltage applied on the switch means is close to zero. The resonator may then start to oscillate at a frequency shifted relative to the initially adjusted frequency, and it may then be difficult for the RF driver circuit to sustain this RF voltage.

It is an object of the invention to provide a radio frequency resonator which at least alleviates the aforementioned problem.

SUMMARY OF THE INVENTION

The invention provides an apparatus having a radio frequency resonator, which has a coil, a capacitor means and at least one switch means being associated with another capacitor means, a recharging means and a high voltage supply means, one end of said switch means being connected to a junction of said coil and said capacitor means where a radio frequency voltage is provided, and another end of said switch means being connected to ground by said another capacitor means and to said high voltage power supply means by said recharging means.

The invention also provides an apparatus having a radio frequency resonator which has at least one switch means, one end of said switch means being connected to a junction where a radio frequency voltage is provided, and said switch means comprising a plurality of switching devices, each said switching device being associated with a parallel capacitor and, optionally, a resistor.

In the MALDI ion source, ions are produced by a laser pulse directed at the sample surface, and are guided into an ion trap using ion optics built inside the MALDI ion source. Before ions are produced, the RF voltage applied on the ring electrode is zero. When the ions are inside the ion-trapping region surrounded by three electrodes, said switch means is closed to charge the capacitance, $C_{RF}$, between the ring electrode and the end-cap electrodes, the capacitance due to additional circuitry, for example a measuring circuit of the RF voltage, and a parasitic capacitance. This charge is supplied from another capacitor, $C_{BIAS}$, connected on the other side of the switch means. Once the capacitance $C_{RF}$ is charged, the switch means is opened immediately to initiate a free oscillation of the resonator. The voltage which appears on the ring electrode after the fast start is determined by a ratio of capacitances connected on each side of the switch means, $C_{RF}$ and $C_{BIAS}$, and becomes lower than the voltage of the high voltage power supply. Then the capacitor $C_{BIAS}$ is recharged to a voltage of the high voltage power supply. Although the voltage applied on the switch is close to zero immediately after the fast start, it increases with a re-charging time constant determined by the capacitor $C_{BIAS}$ and the recharging means connected to the high voltage power supply. This recharging time constant is close to or less than a decay time constant of the resonator and, even within the re-charging time constant, the voltage applied across the switch becomes large enough to reduce a change of capacitance caused by the switch means. Accordingly, a shift of resonance frequency immediately after the fast start of the resonator does not adversely affect the RF oscillation, and the resonator is maintained in a resonance condition.

BRIEF DESCRIPTION OF THE DRAWINGS

A radio frequency resonator, which maintains a resonance condition after fast start of a radio frequency voltage, is now described, by way of example only, with reference to accompanying drawings in which.

DETAILED DESCRIPTION OF PREFERRED EMBODIMENTS

Figure 1:
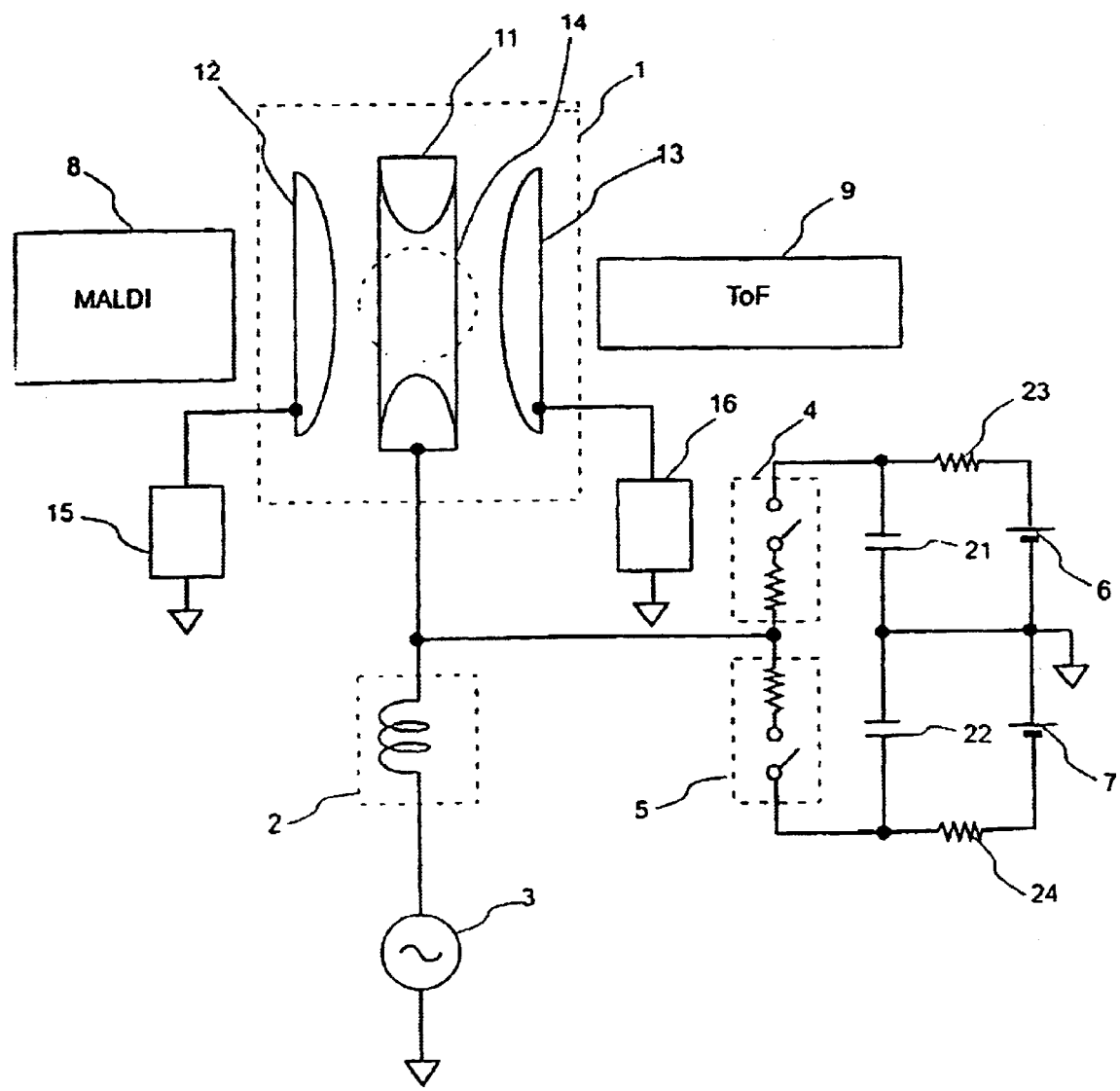
FIG. 1 is a schematic representation of a quadrupole ion trap with a MALDI ion source and a time-of-flight mass spectrometer.

Referring to FIG. 1, a quadrupole ion trap 1 comprises a ring electrode 11 and two end cap electrodes 12 and 13. These three electrodes form an ion-trapping region 14. The end-cap electrodes 12 and 13 are connected to voltage sources 15 and 16, respectively, which provide extraction voltages and voltage waveforms used during ion trap operations. A coil 2 is connected to the ring electrode 11 and followed by a RF driver circuit 3. To the ring electrode 11, two switches 4 and 5 are also connected. These switches may have internal series resistors to prevent overshoot and/or ringing during a switching operation.

One end of each switch 4,5 is connected to the junction of coil 2 and ring electrode 11, whereas another end of each switch 4,5 is connected to ground via a respective capacitor 21,22 and is also connected to a respective high voltage supply 6,7 via a respective resistor 23,24, as shown. The high voltage supplies 6,7 have opposed polarities. It will be appreciated that a single switch 4 and the associated high voltage supply 6, capacitor 21 and resistor 23 could alternatively be used.

Figure 2:
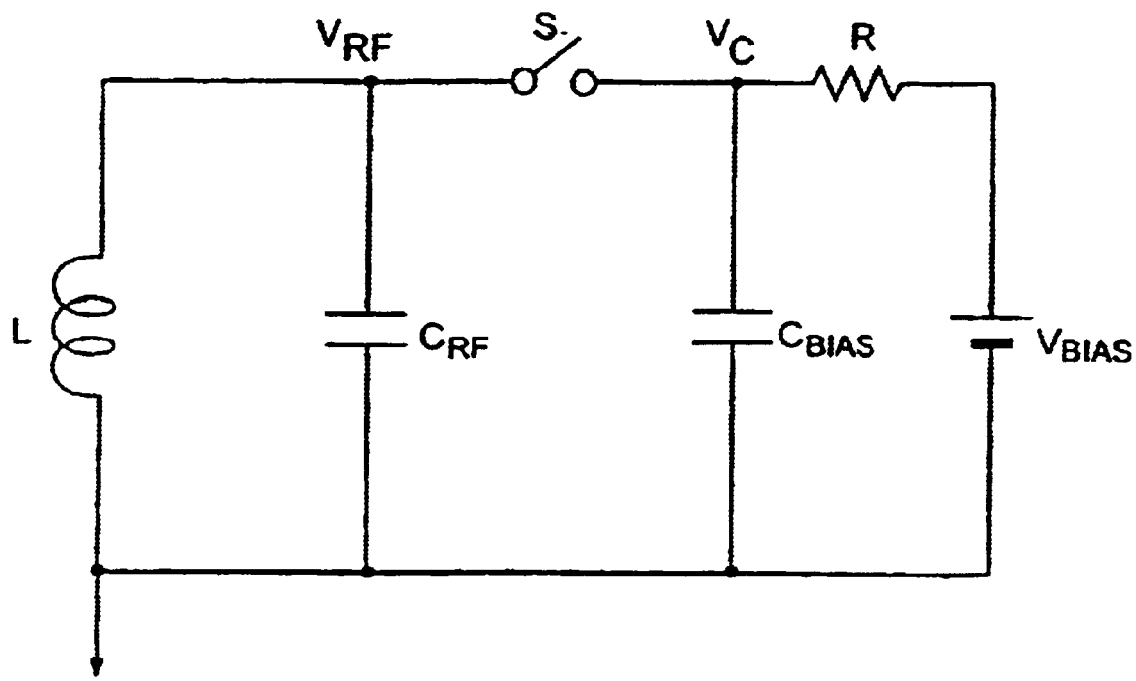
FIG. 2 is a simplified schematic representation of the resonator for which fast start occurs in the positive part of the RF voltage cycle.

FIG. 2 illustrates a simplified schematic representation of the resonator for which fast start occurs on the positive part of the RF voltage cycle. In this illustration an inductor L represents coil 2 and a switch S represents switch 4. A capacitor $C_{RF}$ represents a capacitance between the ring electrode 11 and the end-cap electrodes 12 and 13, the capacitance due to additional circuitry, for example a measuring circuit of the RF voltage (not shown), a capacitance of switch 5 and a parasitic capacitance. A capacitor $C_{BIAS}$ represents a capacitor 21 and resistor R represents resistor 23. A voltage source $V_{BIAS}$ represents high voltage power supply 6. $V_{BIAS}$ also represents the voltage of the voltage source. $V_{RF}$ is the voltage at the junction of the ring electrode 11 and the coil L on one side of switch S and $V_C$ is a voltage on the other side of the switch S i.e. at the junction of capacitor $C_{BIAS}$ and resistor R.

Figure 3:
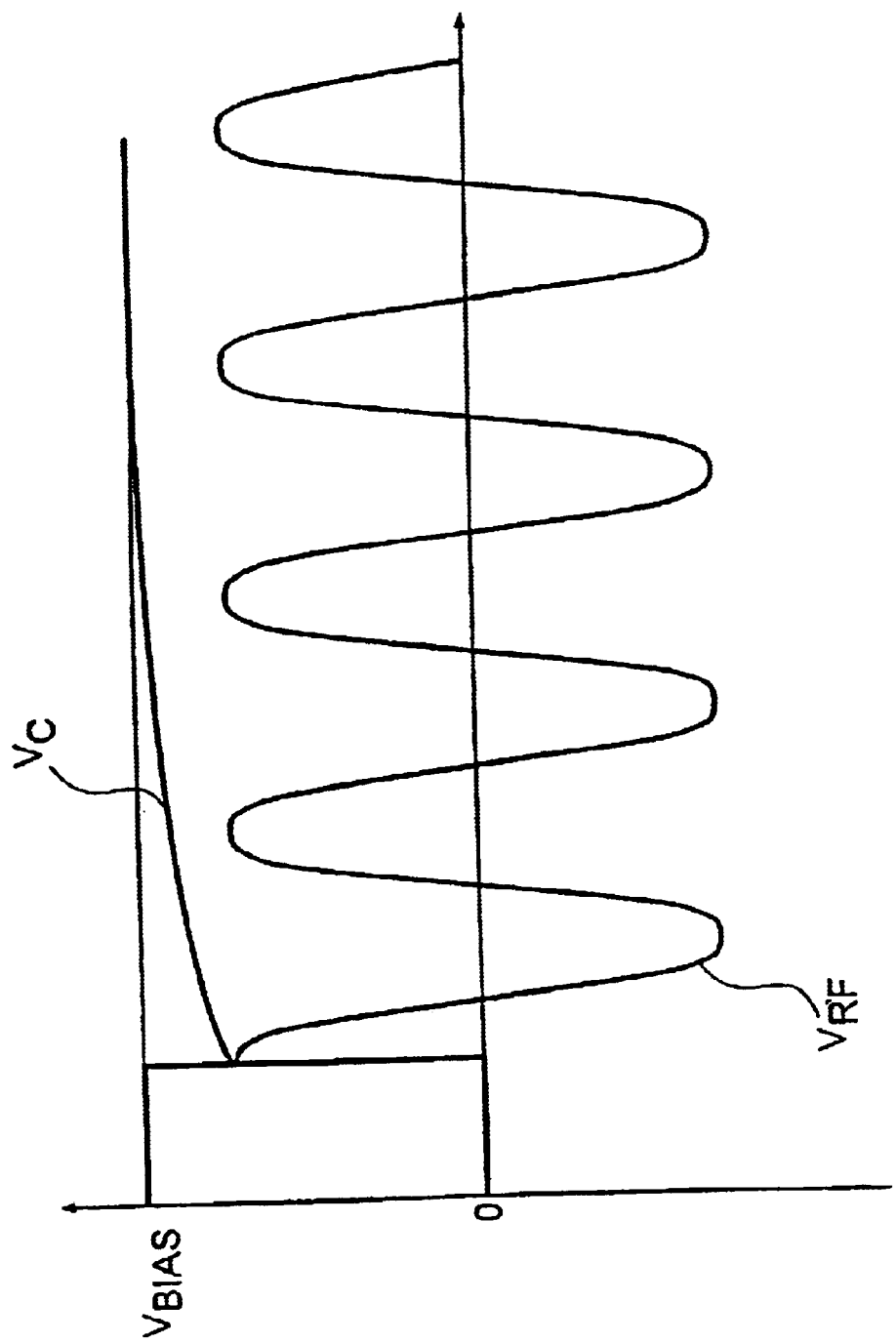
FIG. 3 is an explanatory timing diagram showing a RF voltage applied on one side of a switch and a voltage $V_c$ applied on another side of the switch.

The operation of the switch for fast start of the resonator on the positive part of the RF voltage cycle is now explained with reference to the voltage waveforms shown in FIG. 3. Before a switching operation the voltage on the ring electrode $V_{RF}$ is zero and the voltage $V_C$ on the capacitor $C_{BIAS}$ is $V_{BIAS}$. At the time of fast start, switch S is closed to charge the capacitor $C_{RF}$, and the voltages $V_{RF}$ and $V_C$ will have the same value. This voltage is selected in order to prevent the resonator from suffering a remarkable shift of resonance by adjusting the capacitance of $C_{BIAS}$, so that the voltage $V_{BIAS}$ is always set higher, in a fixed proportion to the required peak RF voltage for fast start. Then, switch S is opened and the resonator starts to oscillate. If the voltage $V_C$ were to remain at the same value, the voltage $V_{RF}$ would approach $V_C$ during every RF cycle and the change of capacitance of the switch might then disturb the resonance condition. But, actually, capacitor $C_{BIAS}$ is recharged through resistor R, and the voltage $V_C$ recovers to the voltage of $V_{BIAS}$. Thus, the voltage difference on opposite sides of the switch S, i.e. the difference between $V_{RF}$ and $V_C$, does not approach zero and so there is no significant change in the capacitance of the switch. A recovery time constant of the voltage $V_C$ is determined by R and $C_{BIAS}$, and it is selected to be close to or less than a decaying time constant of the resonator. Thus, the effect of the capacitance change of the switch (when $V_{RF}$ and $V_C$ approach close to each other), becomes negligible. Furthermore, the resistor R can be replaced with another switch. This switch is opened before the RF start-up and closed just after the RF start-up is completed to recharge capacitor $C_{BIAS}$. Thus, the recovery of $V_C$ towards the voltage $V_{BIAS}$ becomes more rapid.

Figure 4:
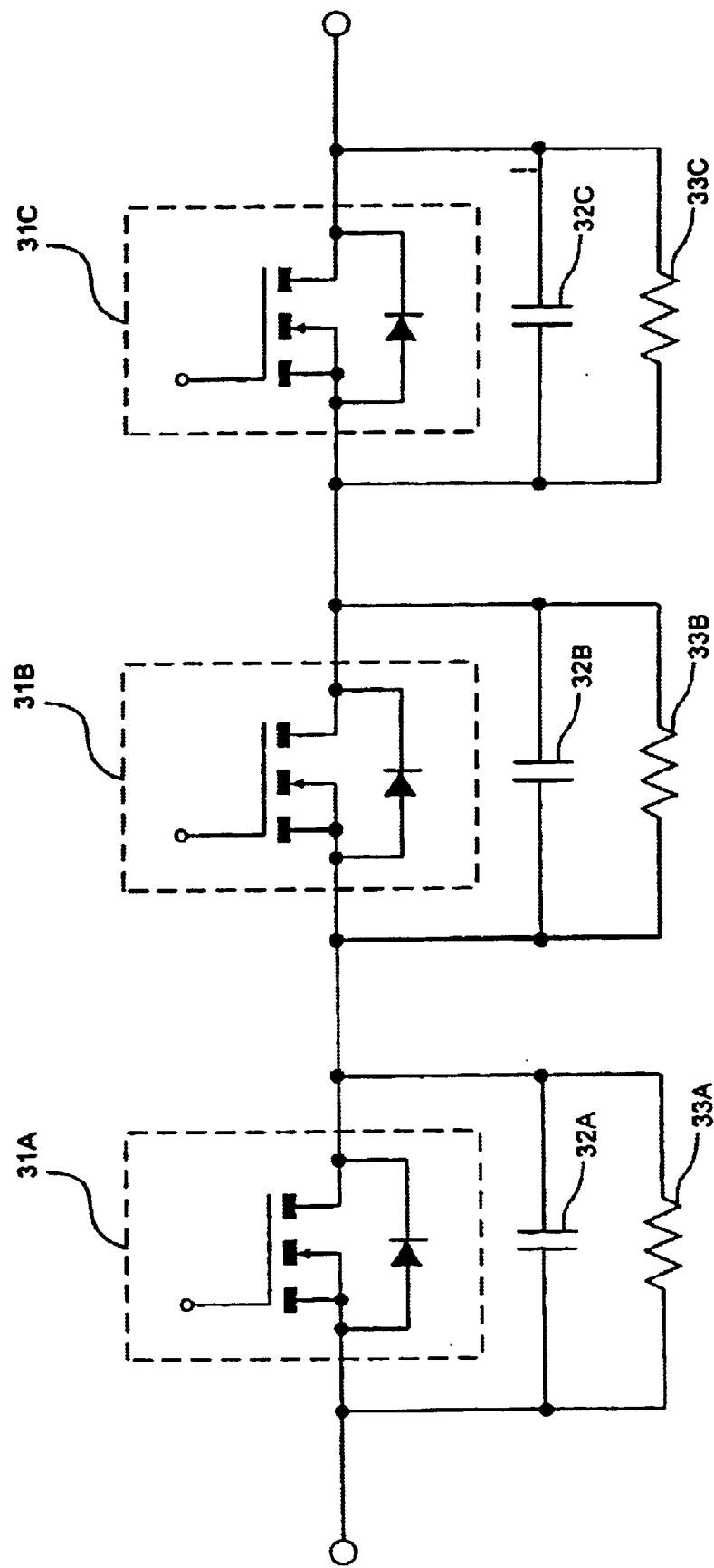
FIG. 4 shows an example of a switch having three stages, each stage comprising a MOSFET switching device associated with a capacitor and a resistor in parallel.

FIG. 4 shows an example of a switch (e.g. 4 or 5) which consists of three identical switching modules each comprising a MOSFET switching device associated with a capacitor and a resistor in parallel. A plurality of switching modules is used not only to increase voltage rating but also to reduce capacitance and its drastic change depending on the applied voltage. The switching modules 31A, 31B and 31C are MOSFET devices—gate voltage control circuits are not shown for clarity. When a voltage applied to a switch is divided equally between three switching modules, the voltage on each MOSFET switching device will be one third of the applied voltage. The increase in capacitance of each MOSFET switching device is approximately $$\sqrt{3}$$

times larger than for a switch with a single MOSFET module, but the total capacitance of a switch with three modules will be $$\frac{1}{\sqrt{3}}$$

of the capacitance of a switch with a single MOSFET module. Therefore, a change of capacitance caused by an applied voltage will also be reduced to $$\frac{1}{\sqrt{3}}$$

of that of a switch with single MOSFET module. So the provision of parallel resistors 33A, 33B and 33C is a simple way of dividing an applied voltage equally between the three stages. Unfortunately, there are reasons why the voltage applied to the switch is not divided equally between the stages when a RF voltage is applied to the switch. The effect of a parasitic capacitance between a module and ground is larger for the module located on one side of the switch where RF voltage is applied because more charge is required to charge this capacitance. There also occurs natural scattering of the capacitance of each MOSFET switching device. When one of the modules has a higher applied voltage than that of the other modules, and/or a capacitance of one of the modules is smaller than that of the other modules, that module suffers a larger voltage change. The voltage of that module increases as the capacitance decreases, and the smaller capacitance of that module further increases the share of voltage supplied to the module. Therefore, the increase in voltage of that module becomes larger than that of other modules. Thus, an initial voltage or capacitance difference will be enhanced by application of the RF voltage. Capacitors, 32A, 32B and 32C, placed in parallel with each switching module are especially useful to reduce this effect. A fixed capacitance of those capacitors equalizes the voltage on each switching module because a change of capacitance of the switching device will be smaller and negligible compared to this fixed capacitance. Thus, the parallel capacitors, 32A, 32B and 32C, play a very important role for stabilizing resonance when RF voltage is applied to a switch which consists of a plurality of switching devices, such as that shown in FIG. 4.

What is claimed is:

1. An apparatus having a radio frequency resonator, including capacitor means characterized in that said radio frequency resonator further includes a coil and said apparatus also includes at least one switch means connected at a junction of said capacitor means and said coil for fast start of the radio frequency voltage at said junction, another capacitor means connecting the other end of said switch means to ground, a high voltage supply means and a recharging means connecting said high voltage supply means to said another capacitor means for recharging.

2. An apparatus as set forth in claim 1 wherein said recharging means is a resistor.

3. An apparatus as set forth in claim 1 wherein said recharging means is another switch means.

4. An apparatus as set forth in claim 1, wherein said radio frequency resonator is part of an ion-trapping device.

5. An apparatus as set forth in claim 4, wherein said ion-trapping device is a quadrupole ion trap.

6. An apparatus as set forth in claim 5, wherein said quadrupole ion trap is associated with a MALDI ion source and/or a time-of-flight mass spectrometer.

7. An apparatus as set forth in claim 1, wherein said switch means comprises a switching device.

8. An apparatus as set forth in claim 1, wherein said switch means comprises a plurality of switching devices connected in series.

9. An apparatus as set forth in claim 8, wherein each said switching device is associated with a parallel capacitor and, optionally, a resistor.

10. An apparatus as set forth in claim 7, wherein said switching device comprises a semiconductor switching devices, such as MOSFET, IGBT, bipolar transistor, thyristor, etc., having a gate driver circuit.

11. An apparatus as set forth in claim 1, wherein said switch means being associated with a series resistor means.

12. An apparatus as set forth in claim 1, wherein said capacitor means consists of the capacitance between a ring electrode and end-cap electrodes, the capacitance due to additional circuit, for example the measuring circuit of the RF voltage, and a parasitic capacitance.

13. An apparatus as set forth in claim 1, wherein said at least one switch means comprises a plurality of switching devices, each said switching device being associated with a parallel capacitor and, optionally, a resistor.

14. An apparatus as set forth in claim 1 further including an RF driver circuit for sustaining and further handling a radio frequency oscillation.

15. A method of operating the apparatus of claim 1 including the steps of closing said switch means to discharge said another capacitor means whereby to charge said capacitor means to fast start said radio frequency voltage at said junction, and opening said switch means to recharging said another capacitor means via said recharging means after the voltage at said junction becomes the voltage on said another capacitor means.

16. A method as set forth in claim 15 wherein said recharging means is a resistor.

17. A method as set forth in claim 15 wherein said recharging means is another switch means.

* * * * *